(12) United States Patent
Mainguet (10) Patent No.: US 11,798,502 B2
(45) Date of Patent: Oct. 24, 2023

(54) DISPLAY DEVICE WITH LOCAL COMPRESSION AND DECOMPRESSION OF DISPLAYED DIGITAL DATA

(71) Applicant: COMMISSARIAT A L'ENERGIE ATOMIQUE ET AUX ENERGIES ALTERNATIVES, Paris (FR)

(72) Inventor: Jean-François Mainguet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/820,018

(22) Filed: Aug. 16, 2022

(65) Prior Publication Data

US 2023/0058798 A1    Feb. 23, 2023

(30) Foreign Application Priority Data

Aug. 18, 2021 (FR) ..................... 21 08755

(51) Int. Cl.
*G09G 3/34* (2006.01)
*G09G 3/20* (2006.01)

(52) U.S. Cl.
CPC ......... *G09G 3/3406* (2013.01); *G09G 3/2074* (2013.01); *G09G 2300/0452* (2013.01)

(58) Field of Classification Search
CPC ............... G09G 3/3406; G09G 3/2074; G09G 2300/0452
See application file for complete search history.

(56) References Cited

U.S. PATENT DOCUMENTS

| 10,685,945 B2 | 6/2020 | Robin et al. |
| 10,902,792 B2 | 1/2021 | Dupont |
| 2009/0146917 A1 | 6/2009 | Kharrati et al. |

(Continued)

FOREIGN PATENT DOCUMENTS

| EP | 3 381 060 A1 | 10/2018 |
| EP | 3 550 550 A1 | 10/2019 |

(Continued)

OTHER PUBLICATIONS

French Preliminary Search Report dated May 3, 2022 in French Application 21 08755 filed on Aug. 18, 2021 (with English Translation of Categories of Cited Documents), 2 pages.

(Continued)

*Primary Examiner* — Adam R. Giesy
(74) *Attorney, Agent, or Firm* — Oblon, McClelland, Maier & Neustadt, L.L.P.

(57) ABSTRACT

Display device including:
an array of pixels comprising several pixel blocks;
a video card comprising an input configured to receive a digital signal to be displayed by the array of pixels, and an output coupled to the blocks via at least one main data bus;
and wherein:
the array of pixels comprises control circuits each associated with one of the blocks, coupled to the main data bus and including a main memory circuit;
the video card includes a compression circuit configured to compress, before sending them to the output, the digital data to be displayed by the blocks;
each control circuit includes a decompression circuit for decompressing the part of the digital data received by the control circuit before storing them in the main memory circuit.

14 Claims, 7 Drawing Sheets

(56) References Cited

U.S. PATENT DOCUMENTS

| | | |
|---|---|---|
| 2018/0247922 A1 | 8/2018 | Robin et al. |
| 2018/0304151 A1 | 10/2018 | Hicks et al. |
| 2019/0311681 A1 | 10/2019 | Dupont |
| 2021/0142716 A1 | 5/2021 | Robin et al. |

FOREIGN PATENT DOCUMENTS

| | | |
|---|---|---|
| EP | 3 649 672 A1 | 5/2020 |
| WO | WO 2017/089676 A1 | 6/2017 |

OTHER PUBLICATIONS

Templier et al., "A New Approach for Fabricating High-Performance MicroLED Displays", SID Symposium Digest of Technical Papers, vol. 50 (1), Jun. 1, 2019, 4 pages.

DISPLAY DEVICE WITH LOCAL COMPRESSION AND DECOMPRESSION OF DISPLAYED DIGITAL DATA

TECHNICAL FIELD

This document relates to the field of pixel array display devices, and applies advantageously to the production of large screens.

PRIOR ART

Conventionally, a display device such as a television screen or a computer screen receives a video signal through a video cable, for example an HDMI cable. The video signal corresponds to a digital signal encoding, without compression, luminosity values to be displayed by each pixel of the device (generally at least three values for each pixel, that is to say one for each colour, in the case of RGB pixels). This video signal is for example calculated by a graphics card of a device (computer, decoder, etc.) to which the display device is connected by the video cable.

The video signal received by the display device is in practice received by a video card which carries out various operations of decoding, conversion and distribution of data intended for an array of pixels of the display device. The video card can perform all or part of a digital-to-analogue conversion of the data intended for the array of pixels. In the most frequent case where the digital-to-analogue conversion is carried out in the video card, the latter outputs analogue values that can be displayed by the array of pixels. In the case where the video card sends digital values to the pixels, the video card must ensure the generation of a set of pixel control signals in order to control the display time of each pixel, for example with PWM (Pulse Width Modulation) or BCM (Binary Coded Modulation) modulation control signals. In these examples of pixel control signals, there is no digital-to-analogue conversion in so far as each pixel is "On/Off" controlled, or in other words "emits/does not emit".

Each pixel of the display device generally comprises several lighting elements allowing the display of one pixel of each of the images to be displayed by the device. A pixel generally includes at least three lighting elements the intensity of which can be modulated and each dedicated to one of the colours red, green and blue. Each lighting element can include either a light emitter, the intensity of which can be modulated, directly in the target colour of this element (case of OLED) or composed of a source of blue light which is filtered and/or added with phosphors to obtain the target colour (case of other types of LED), or a light modulator (case of liquid crystals) coupled to an appropriate colour filter to obtain, from a white light emitted by a source common to the pixels, the target colour.

The analogue values obtained after digital-to-analogue conversion or the emission durations for each pixel are proportional to the light intensity levels to be displayed by each of the lighting elements of the pixels. Each lighting element can be coupled to a selection transistor allowing to control the display of the light signal by the lighting element. The display device also includes row driver circuits controlling the selection transistors, and column driver circuits sending the values corresponding to the data to be displayed to the pixels.

The increase in the resolution of display devices results in an increase in the number of rows and columns of the array of pixels of the device (7680 columns and 4320 rows in the 8K format), which has the consequence of multiplying the number of electronic chips (forming in particular the row and column drive circuits) around the array of pixels, as well as the number of wires necessary to address the lighting elements of the pixels.

In addition, in the case of a device allowing the display of videos or 3D images, that is to say multiscopic display, the amount of information sent for each pixel is even greater taking into account the multitude of viewpoints of the image to be displayed by the device, which requires a multiplication of the number of lighting elements per pixel, and therefore a greater number of wires necessary to address the lighting elements of the pixels. The energy required for the lighting elements and which is to be transmitted to the pixels is also significant.

A reduction in the number of wires necessary to address the lighting elements of the pixels would be judicious. However, this would be accompanied by an increase in the data rate to be transmitted on the remaining wires.

DESCRIPTION OF THE INVENTION

Therefore there is a need to provide a display device the architecture of which allows to reduce the complexity of the wiring and the number of wires necessary to address the lighting elements of the pixels of the display device, while limiting the rate of the data passing through these wires.

For this purpose, one embodiment proposes a display device including at least:
an array of display blocks, each display block being configured to display at least one pixel of an image and comprising several lighting elements and at least one drive circuit configured to generate control signals for the lighting elements of the display block from digital data intended to be displayed by the lighting elements of the display block;
an array of control circuits, each coupled and associated with at least one display block and including a first main memory circuit configured to store the digital data intended to be displayed by the lighting elements of the associated display block;
a video card comprising at least one input configured to receive a digital signal to be displayed by the array of display blocks, and at least one output coupled to the array of control circuits, the video card being configured to decode the digital signal and send to the control circuits the digital data intended to be displayed by the lighting elements and encoded in a format adapted to the array of display blocks;
and wherein:
the video card includes at least one compression circuit configured to compress, before sending them to the output, the digital data intended to be displayed by the lighting elements;
each control circuit includes a decompression circuit configured to decompress the digital data intended to be displayed by the lighting elements of the display block associated with the control circuit before storing them in the first main memory circuit of the control circuit.

This display device replaces the conventional row/column addressing with a display block addressing. This is made possible thanks to the use of electronic circuits downstream of the video card, namely the control circuits associated with the display blocks and the drive circuits. Thanks to this configuration allowing to group together certain operations on the data to be displayed, the wiring required to address the light emitters is simplified and requires fewer wires. In addition, the electronic chips generally disposed on the periphery of the array of lighting elements are eliminated and the wiring of the rows or columns can disappear, which makes this configuration particularly advantageous for the production of large screens.

A main difference between a conventional display device and the proposed display device is that the data sent at the output of the video card are digital here, and the generation of the control signals for the lighting elements is carried out within each display block comprising the lighting elements.

By performing data compression in the transmission between the video card and the control circuits, this allows to reduce the amount of data to be transmitted to the control circuits. Compared to the display devices of the prior art, this results either in a reduction in the consumption of the buses on which the digital data are transmitted for a given display frequency, or in an increase in the number of lighting elements to which data can be sent for a given rate, and therefore a reduction in the number of wires for a screen of a given size.

Display blocks may be grouped into display block groups, each group comprising several display blocks. The video card may send the digital data to be displayed in parallel to the different groups, which allows to increase the speed of data transmission within the array of display blocks.

The video card, which can also be called a driver card, of the display device may receive the digital data from outside the display device, for example via a cable such as an HDMI cable. The video card does not correspond to a graphics card (which is for example part of a computer, a decoder, etc.) whose role is to define and send the digital data of complete images to the display device.

The video card corresponds to an electronic card including one or more integrated circuits and which is dedicated to driving the arrays of control circuits and display blocks. The video card performs, from the digital signal received at the input, various operations of decoding, conversion and distribution of data intended for the array of control circuits. In the proposed display device, the video card does not carry out the digital-to-analogue conversion of the data intended for the lighting elements. The video card may ensure the generation of a set of control signals, for example with PWM (pulse width modulation) or BCM (binary coded modulation) control signals. In addition, the video card may include only digital integrated circuits, which facilitates its production.

The video card is configured to carry out a decoding of the digital signal received, then a new encoding of the digital data obtained according to a format adapted to the array of display blocks, that is to say in a format adapted to the control circuits, the type of lighting elements and the elements used to distribute these data in the display blocks.

The control signals of the lighting element control, at each of the lighting elements, the display of a certain brightness value during a display reference period corresponding to the duration of display of an image by the array of pixels.

The output of the video card corresponds to a digital data output which is coupled to the control circuits matrix by a data distribution circuit or network.

Furthermore, digital data intended to be displayed by the lighting elements of each display block are from the digital signal received by the video card and intended to be displayed by the display blocks matrix. A single data distribution circuit may be coupled to all display blocks such that data crosses all blocks.

Advantageously, each display block may corresponds to a module distinct from the other display blocks and may be transferred onto a support, e.g. a single support, on which the array of control circuits is located. Such pixels are very advantageous because they are particularly well adapted for the production of large screens which require, for cost reasons, to use a support which is not a semiconductor wafer. The production of the display blocks in the form of such modules also allows to have more space for the power supply lines of these blocks due to the support surface available between the modules, which allows to reduce the access resistances. This configuration further allows to consider the production of the conductive lines of the device in a single level.

The support on which the display blocks are located may be of the printed circuit type, or more generally may correspond to a substrate on which electrically conductive connections are made, for example in the form of rows and columns. This substrate may for example comprise glass, plastic or metal. The connection rows and columns may be produced on this substrate, for example by screen printing, by inkjet, etc.

Each control circuit may further include a second main memory circuit configured to memorise the compressed digital data received by the control circuit and intended to be displayed by the lighting elements of the display block associated with the control circuit.

In this case, the second main memory circuit of each control circuit may be of the FIFO ("First In First Out") type. The second main memory circuit may then be configured to form a buffer storage memory of the compressed digital data received before the implementation of the decompression operation. Such a buffer memory allows to absorb the variations in the rate of the compressed digital data received, in particular when the latter are compressed with a variable compression rate.

The compression circuit of the video card and the decompression circuit of each control circuit may be configured to implement at least one JPEG, RLE or Golomb type compression/decompression algorithm.

Each display block may be configured to display a block of 8×8 pixels of the image, or a block of 16×16 pixels of the image, or a block of 32×32 pixels of the image.

The video card compression circuit and the decompression circuit of each control circuit may be configured to implement several different compression/decompression algorithms to compress and decompress the digital data corresponding to one or more images intended to be displayed by the array of display blocks. Thus, it is possible to choose the most efficient algorithm according to the digital data to be compressed, either from one image to another, or within the same image to be displayed, some parts being compressed with a first algorithm, others with a second algorithm, the video card being able to indicate in the header which algorithm to use for each part.

The display device may be a multiscopic device wherein:
  each display block is configured to display at least one pixel of a 3D image formed by N images of the same dimensions intended to be displayed simultaneously by the display device, each pixel of the 3D image comprising N sub-pixels of the same spatial coordinates and each belonging to one of the N images,
  the compression circuit is configured to compress the digital data intended to be displayed by the lighting elements of each display block by using a redundancy of information between the N sub-pixels of the same pixel.

The expression "N sub-pixels of the same spatial coordinates" means that in the N images of the same dimensions forming together the 3D image, each of these N sub-pixels occupies the same position within the image.

In the case of a multiscopic device, this may be such that:
the compression circuit is configured to carry out a first compression using a redundancy of information between the N sub-pixels of the same pixel, and to carry out a second compression of the data resulting from the first compression by using a redundancy information between neighbouring pixels intended to be displayed by the same display block;
the decompression circuit of each control circuit is configured to carry out a decompression corresponding to the reverse operation of the second compression;
each display block includes a secondary decompression circuit configured to carry out a decompression corresponding to the reverse operation of the first compression.

In this case, the redundancies between sub-pixels and the redundancies between neighbouring pixels of a 3D image are used judiciously to optimise the compression/decompression of the data.

As a variant, the display device may be such that:
the compression circuit is configured to carry out a first compression using a redundancy of information between the digital data corresponding to several pixels of the same spatial coordinates and belonging to several images of the same dimensions intended to be displayed successively by the display device, and to carry out a second compression of the data resulting from the first compression by using a redundancy of information between neighbouring pixels intended to be displayed simultaneously by the same display block;
the decompression circuit of each control circuit is configured to carry out a decompression corresponding to the reverse operation of the second compression;
each display block includes a secondary decompression circuit configured to carry out a decompression corresponding to the reverse operation of the first compression.

In this case, the redundancies between neighbouring pixels of the same image and between pixels of the same spatial coordinates of successive images are used judiciously to optimise the compression/decompression of the data.

Each control circuit may include at least one data reception circuit configured to identify the digital data intended to be displayed by the lighting elements of the display block associated with the control circuit.

In this particular configuration, the routing of the different parts of digital data in the different display blocks may be done by addressing. This configuration may be implemented regardless of the size of the parts of the digital data, that is to say regardless of the amount of digital data intended for each display block, whether or not this size is constant from one display block to another. In each control circuit, once identified by the data reception circuit, the part of the digital data intended to be displayed by the display block with which the control circuit is associated may be sent in the decompression circuit of the control circuit. In each control circuit, a data output from the main address decoding circuit may be coupled to a data input from the decompression circuit.

In another particular configuration, the control circuits may include shift registers separate from the main memory circuits and coupled in series from one control circuit to another. Such a configuration may be implemented when the size of the parts of the digital data sent to the display blocks is constant. In each control circuit, a data output from the shift register may be coupled to a data input from the main memory circuit so that the shift register can transfer that data to the main memory circuit.

The video card may further include at least one FIFO type memory configured to store the digital data intended to be displayed by the lighting elements before sending them to the control circuits.

Each control circuit may be formed by a chip separate from the associated display block (which has the advantage that all the display blocks can be identical), or each control circuit may be integrated into the associated display block (all the pixels other than those integrating the control circuits can be identical).

Each control circuit may be configured to implement, after the decompression, at least one digital processing of the digital data intended to be displayed by the lighting elements.

The drive circuits of the lighting elements may include PWM or BCM modulators, or digital-to-analogue converters.

At least part of the display blocks may each include at least one photodetector coupled to at least part of an analogue-to-digital converter.

Throughout the text of this application, the term "coupled" can designate either a direct connection between two elements, with no intermediate element between them, or an indirect connection between these two elements, that is to say a connection formed through at least one intermediate element.

BRIEF DESCRIPTION OF DRAWINGS

The present invention will be better understood upon reading the description of exemplary embodiments given purely for information and in no way limiting with reference to the appended drawings wherein.

Identical, similar or equivalent parts of the various figures described below bear the same numeric references so as to facilitate passage from one figure to another.

The different parts shown in the figures are not necessarily shown on a uniform scale, to make the figures more readable.

The different possibilities (variants and embodiments) must be understood as not mutually exclusive and can be combined with each other.

DETAILED DESCRIPTION OF PARTICULAR EMBODIMENTS

A display device 100 according to a first embodiment is described below in connection with FIGS. 1 and 2.

The device 100 includes an array 102 of display blocks 106. Each display block 106 of the array 102 is configured to display at least one pixel of an image intended to be displayed by the device 100. In the exemplary embodiment described here, each display block 106 is configured to display several pixels of each image intended to be displayed by the device 100.

Each display block 106 includes several distinct lighting elements 118. The lighting elements 118 correspond for example to LEDs (or microLEDs) or OLEDs. In addition to this or these lighting elements 118, each display block 106 also includes secondary memory circuits 120 configured to memorise the digital data intended to be displayed by the lighting elements 118 of the display block 106, and drive circuits 122 configured to generate control signals for these lighting elements 118 from the digital data intended to be displayed by the lighting elements 118 of the display block 106 and memorised in the secondary memory circuits 120 of the display block 106.

The integration of these electronic circuits 120, 122, for example produced in CMOS technology, within the display blocks 106 with the lighting elements 118 may be carried out as described in documents EP 3 381 060 A1 and "A New Approach for Fabricating High-Performance MicroLED Displays" by F. Templier and al., SID Symposium Digest of Technical Papers, Volume 50 (1), Jun. 1, 2019. For example, LEDs corresponding to lighting elements 118 and electronic circuits 120, 122 of different display blocks 106 may be produced on different substrates 103, then cut out, assembled in the form of distinct modules 105 (each display block 106 corresponding to a module 105 distinct from the other display blocks 106) and finally transferred onto a support 107, corresponding for example to one or more printed circuits or to one or more substrates as described above, intended to also be used as a support for the other elements of the device 100.

Figure 7:
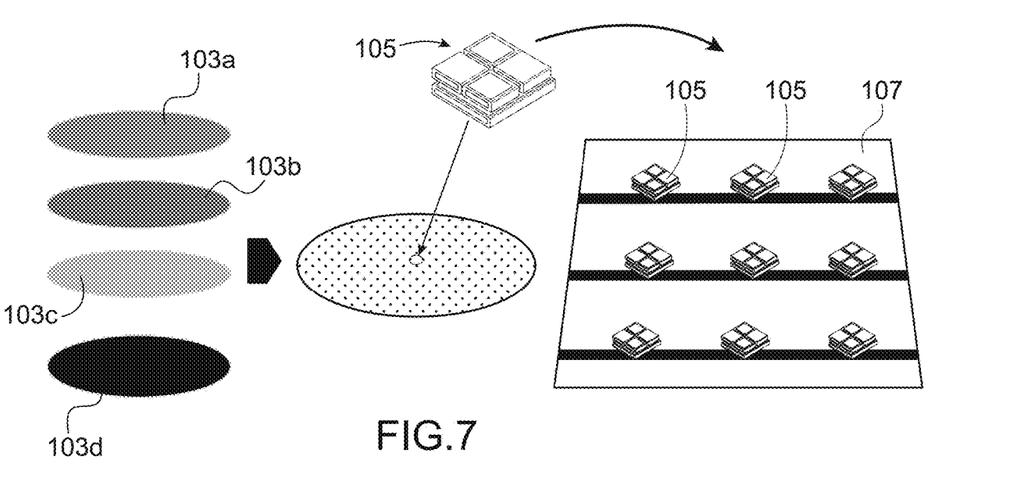
FIG. 7 schematically shows an exemplary embodiment of electronic chips integrating lighting elements and control electronics of a display device.

FIG. 7 schematically shows the implementation of such an integration of display blocks 106 in the form of modules 105. In the example of this figure, lighting elements 118 intended to emit each of the colours red, green and blue are made on different semiconductor wafers referenced 103a, 103b and 103c for each of these colours. The electronic circuits (here circuits 120 and 122) are produced in CMOS technology on another semiconductor plate 103d. The lighting elements 118 produced on the plates 103a, 103b and 103c are cut and then assembled on the plate 103d. The display blocks 106 obtained are cut in the form of independent modules 105. As a variant, the lighting elements 118 may be made on a single plate, and the emission of different colours by these lighting elements 118 is obtained by adding phosphors on the lighting elements 118 intended to produce a light emission of red or green colour. In this case, the plate on which the lighting elements 118 are made may be integral with the plate 103d without prior cutting of the lighting elements 118.

Each module 105 forms a display block 106 comprising the various lighting elements 118 of the display block 106, disposed on a CMOS part wherein the electronic circuits of the display block 106 are made. These modules 105 are then transferred onto the support, bearing the reference 107 in FIG. 7, at a desired distance from each other.

Thus, each module 105 forms a compact assembly of one or more electronic chips (advantageously obtained using microelectronic component manufacturing methods), provided with a connection face including connection pads intended to be fixed and electrically connected to connection pads corresponding to the transfer support. Thus, each module 105 comprises a monolithic chip or an assembly of several monolithic chips electrically connected, and a plurality of modules, for example identical or similar, are mounted on the same transfer substrate, each module corresponding for example to a display block of the display device. By way of example, the elementary modules of the display devices described each include a plurality of LEDs and a control circuit comprising transistors, and may be manufactured according to methods identical or similar to those described in the patent application WO 2017089676.

In the exemplary embodiment described here, the device 100 corresponds to a colour screen and each pixel of the image displayed by the device 100 is obtained with three distinct lighting elements 118, each intended to emit a light signal from one of the colours red, green or blue.

As a variant, each pixel of the image displayed by the device 100 may be displayed by more than three distinct lighting elements 118, such as for example when the device 100 is a multiscopic device intended to simultaneously display an image according to several viewpoints (in the purpose of displaying this image in 3D), with for example in this case each pixel of the image displayed by the device 100 which is displayed by as many distinct lighting elements 118, or sets of lighting elements 118, as viewpoints of the image to be displayed. Such a variant is described in detail below.

As a variant, each pixel of the image displayed by the device 100 may be obtained with a single lighting element 118, for example when the device 100 corresponds to a monochrome screen.

Figure 1:
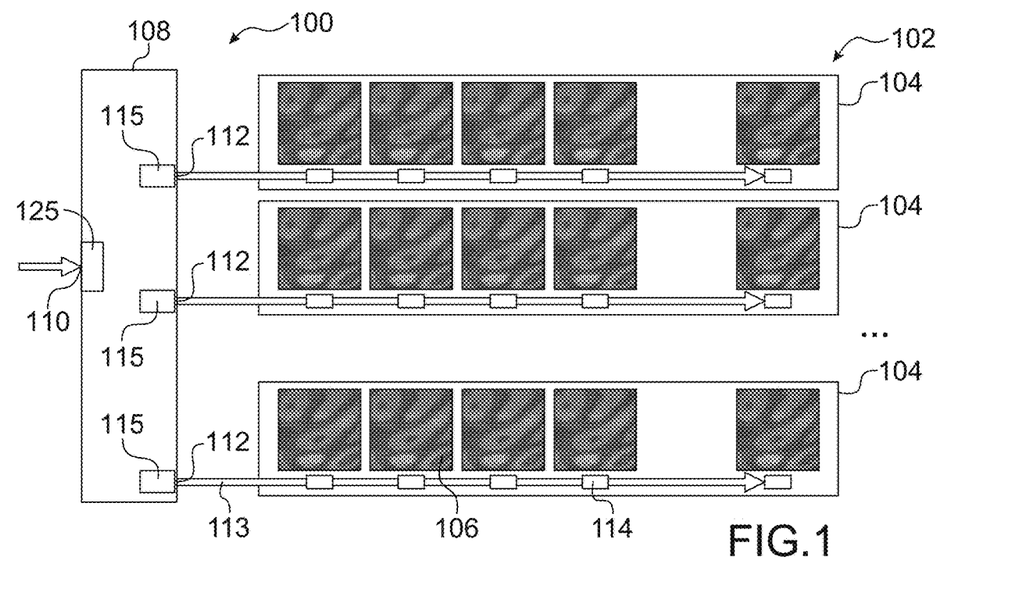
FIG. 1 schematically shows a display device according to a first particular embodiment.

In the particular configuration shown in FIG. 1, the array 102 is divided into several groups 104. Each group 104 includes several display blocks 106.

According to an exemplary embodiment, the groups 104 form rows of display blocks 106. The display blocks 106 are for example configured to display blocks of 8×8 pixels of the image displayed by the device 100. Other sizes of display blocks 106 are possible, and are for example configured to each display a block of 16×16 pixels, 32×32 pixels, etc., of the image displayed by the device 100.

The device 100 includes a video card 108 comprising an input 110 configured to receive a digital signal corresponding to the image(s), or the video(s), intended to be displayed by the device 100. The input 110 is for example of the HDMI type.

The image or video signal received by the device 100 on the input 110 of the video card 108 may come from any electronic or computer device such as a computer, a decoder, etc. A connection between the display device 100 and the device sending the digital data to the display device 100 is formed for example by an HDMI cable.

The video card 108 further includes one or more memories 125 allowing the data received on the input 110 and corresponding to one or more images to be displayed by the device 100 to be memorised. Advantageously, the at least one memory 125 is of the FIFO type.

The video card 108 includes one or more outputs 112 each coupled to a group 104. The video card 108 is configured to decode the digital signal received at the input, encode then compress the digital data obtained in a format adapted for the array 102, and send them to each of the outputs 112 so that they are displayed by the display blocks 106 coupled to the outputs 112.

The array 102 display blocks 106 may be distributed in groups 104 configured differently than in the example described above.

In the example of FIG. 1, the outputs 112 of the video card 108 are directly connected to the groups 104 of display blocks 106. Alternatively, when the number of groups 104 is too large compared to the number of outputs 112 available for a single chip, the video card 108 may include a main circuit carrying out the functions previously described for the video card 108, and intermediate circuits (not used in the configuration shown in FIG. 1) interposed between the main circuit and the groups 104. Each output of the main circuit may be connected to an intermediate circuit, and each intermediate circuit may include several outputs each connected to a group 104 in order to ensure the distribution and allocation of the digital data to the various groups 104.

The device 100 also includes an array of control circuits 114, each coupled and associated with a display block 106. Each of the control circuits 114 is configured to decompress, memorise and send to the associated display block 106 a part of the digital data sent to the group 104 to which the associated display block 106 belongs and intended to be displayed by the lighting elements 118 of the associated display block 106.

Before arriving at the display blocks 106, the digital data sent from the outputs 112 are compressed and transit over a data distribution circuit which corresponds, in the exemplary embodiment described here, to main data buses 113 connected to the control circuits 114. For this purpose, the video card 108 includes one or more compression circuits 115 compressing the digital data before sending them on the buses 113. In the example of FIG. 1, the video card 108 includes several compression circuits 115, each being connected to one of the groups 104 via one of the buses 113.

Alternatively, the video card 108 may include a single compression circuit 115 used to compress, sequentially over time, all data sent to the array 102.

The compression algorithm used to compress the digital data to be displayed corresponds for example to the JPEG algorithm. However, other compression algorithms may be used, as described later.

A first exemplary embodiment of one of the control circuits 114 of the display device 100 is described below in connection with FIG. 2.

Each control circuit 114 includes a data reception circuit corresponding here to a shift register 116, and the compressed digital data are transmitted within the or each group 104 by connecting the shift registers 116 of the control circuits 114 associated with the display blocks 106 of the same group 104 in series. Each control circuit 114 may include an amplifier 117, or buffer, to maintain the amplitude level of the data transmitted from one control circuit 114 to the other. In the or each group 104, the shift register 116 of a first control circuit 114 includes its input connected to the or one of the outputs 112 of the video card 108, or to one of the outputs of one of the intermediate circuits when the video card 108 includes such intermediate circuits, via the bus 113.

In the exemplary embodiment described here, because the amount of compressed digital data sent to each control circuit 114 is identical for all control circuits 114, the use of shift registers 116 in each control circuit 114 is possible.

Alternatively, in the or each group 104, all the control circuits 114 may be coupled in parallel to the bus 113. The identification, by each of the circuits 114, of the compressed digital data intended for said circuit may in this case be carried out by a data reception circuit. According to an exemplary embodiment, this data reception circuit may carry out a decoding of addresses associated with the data, the data reception circuit corresponding in this case to an address decoding circuit integrated in each of the control circuits 114. In this case, the circuit memorising the compressed digital data within each of the control circuits 114 may not be a shift register.

In the example of FIG. 1, the control circuits 114 are produced in the form of electronic chips distinct from the chips comprising the display blocks 106. Alternatively, it is possible for each of the control circuits 114 to be formed within the same chip as that including the associated display block 106, which facilitates the distribution of data between the control circuit 114 and the memory circuits 120 of the display block 106 located on the chip.

The secondary memory circuits 120 are each configured to memorise decompressed digital data intended to be displayed by the lighting element(s) 118 coupled to the secondary memory circuit 120. The memory capacity of each secondary memory circuit 120 corresponds at least to the number of bits (for example 3×8 bits in the example of FIG. 2) over which the datum or data to be displayed by the lighting elements) 118 coupled to the secondary memory circuit 120, and which are here intended to display a pixel of the image displayed by the device 100, are coded.

In a particular configuration, within each display block 106, the decompressed digital data to be displayed is propagated by connecting the secondary memory circuits 120 (which include shift registers for this purpose) in series. In FIG. 2, the connection between the output of a secondary memory circuit 120 and the input of a following secondary memory circuit 120 includes an amplifier or buffer 121 allowing to maintain the level of the data signals transmitted from a secondary memory circuit 120 to another.

In an alternative configuration, the decompressed digital data to be displayed may be propagated in each display block 106 on a secondary data bus to which all the secondary memory circuits 120 of the display block 106 are connected in parallel. Addressing the decompressed digital data is in this case carried out so that each secondary memory circuit 120 identifies, via an address decoding circuit, the data intended for said secondary memory circuit. Such an alternative configuration may be considered when the amount of compressed data intended for each control circuit 114 is variable.

Each control circuit 114 includes a circuit configured to receive and temporarily store the compressed digital data corresponding to the digital data intended to be displayed by the lighting elements 118 of the display block 106 with which this control circuit 114 is associated. In the first embodiment described here, this circuit corresponds to the shift register 116. The memory capacity of this circuit is at least equal to the total number of bits on which are coded the compressed digital data to be displayed by the lighting elements 118 of each display block 106. For example, for display blocks 106 each intended to display a block of 8×8 pixels, each of the pixels being intended to be displayed by a set of three lighting elements 118 of the display block 106 and corresponding to a datum coded on 8 bits, the capacity of the shift register is for example equal to 20 bytes, this value being however a function of the type of data compression applied by the video card 108. A compression of the data on a number of bytes greater or less than 20 bytes is possible.

The display device 100 also includes a wire 119 on which is sent, for example from the video card 108, a reset signal and which is coupled to an input of each shift register 116.

The timing of the shift registers 116 is controlled by a clock signal transmitted over a wire 123 on which this clock signal passes and which is connected to a clock input of each shift register 116. This clock signal is for example sent from the video card 108.

The wires 119 and 123 are part of the bus 113 to which control circuits 114 are coupled.

Each control circuit 114 also includes a decompression circuit 127 comprising an input coupled to an output of the shift register 116 of the control circuit 114. The decompression circuit 127 is configured to apply a decompression algorithm of the same nature as the compression algorithm used to compress in the video card 108 the digital data to be displayed, for example of the JPEG type.

An output of the decompression circuit 127 is coupled to an input of a main memory circuit 124 of the control circuit 114, configured to memorise the decompressed digital data delivered at the output of the decompression circuit 127.

The memory capacity of the main memory circuit 124 is at least equal to the total number of bits on which are coded the decompressed digital data to be displayed by each display block 106. For example, for display blocks 106 intended to display blocks of 8×8 pixels, each pixel being intended to be displayed by three lighting elements 118 from a datum coded on 8 bits, the capacity of the main memory circuit 124 is for example equal to 192 bytes (64×3 bytes).

Once the digital data has been decompressed by the decompression circuits 127 then memorised in the main memory circuits 124, said data are sent to the secondary memory circuits 120.

Figure 2:
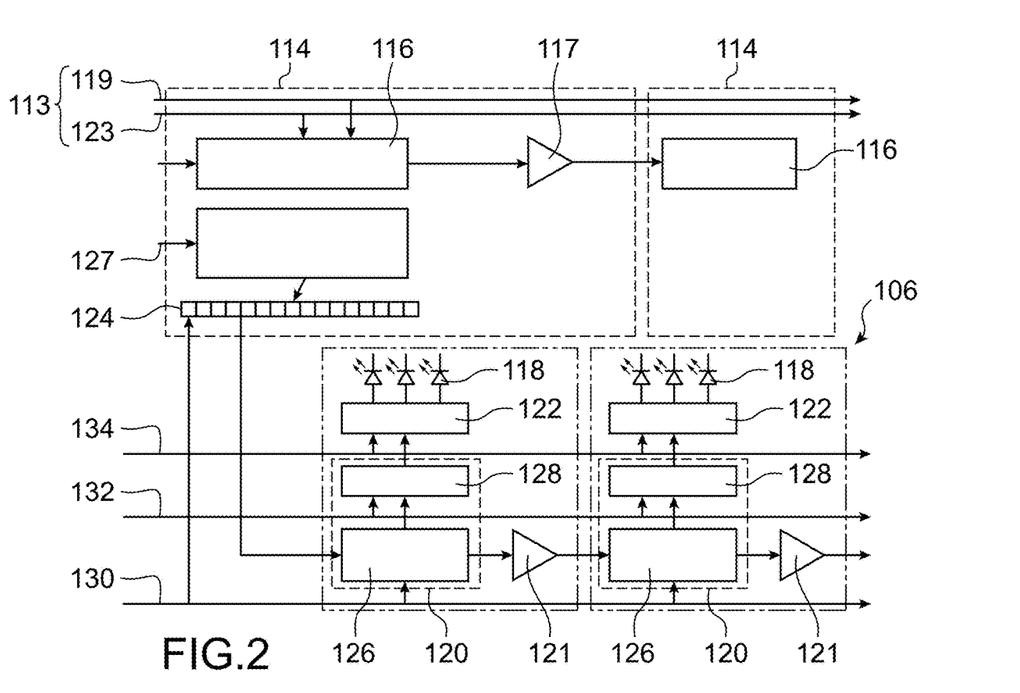
FIG. 2 schematically shows a control circuit of the display device and part of a display block with which the control circuit is associated, according to the first embodiment.

In the exemplary embodiment of FIG. 2, each secondary memory circuit 120 includes a shift register 126 (capable of storing a number of bits equal to the number of bits on which the data to be displayed by the lighting elements 118 associated with this secondary memory circuit 120) coupled to a latch 128 (latch circuit, whose memory capacity is at least equal to that of the shift register 126). One of the registers 126 of the block 106, intended to display the first pixel, receives as input the decompressed digital data memorised in the main memory circuit 124 of the associated control circuit 114. The shift registers 126 are coupled in series, via their data inputs and outputs, within each display block 106 via the amplifiers 121, or buffer.

The shift registers 126 form a chain of registers within each display block 106. For example, the output of a register 126 storing part of the data corresponding to those of a pixel may be connected to the input of a next register 126 intended to store another part of the data corresponding to this pixel or a part of the data corresponding to a "next" pixel. As a variant, it is possible to have a single register common to the secondary memory circuits 120 intended to store the data corresponding to the same pixel, or alternatively, according to another variant, to have, within a display block 106, several chains of registers 126, for example each intended to store the data corresponding to a colour of pixels intended to be displayed by the display block 106. Other variants are also possible.

In the exemplary embodiment of FIG. 2, one of the registers 126 of the display block 106, which is intended to store the data corresponding to a first one of the pixels intended to be displayed by the display block 106, is connected to the control circuit 114 and successively receives as input the data memorised in the main memory circuit 124 of the control circuit 114. At the rate of a clock signal timing the serial movement of the data through the chain of registers 126, the data initially present in the main memory circuit 124 are positioned in all the registers of the chain. The amplifier 121, or buffer, may be present at the output of each register to ensure, if necessary, maintaining the amplitude level of the data transmitted. All the registers 126 of the display block 106 receive as input a shift clock signal generated by the control circuit 114 and controlling the shifting of data in the registers. The offset clock signal may be generated by the control circuit 114 from the main clock signal transmitted over the bus 113. Finally, all the latches 128 of the display block 106 receive a memorisation trigger signal generated by the control circuit 114 and which controls the storage, in the latches 128, of the digital values present in the registers 126. This memorisation trigger signal is for example generated from the display trigger signal transmitted over a wire 132, for example when data transmission in all control circuits 114 is completed in the group 104.

A display control signal travels over a wire 134 and is applied at the input of the drive circuits 122 to control the generation of the control signals of the lighting elements 118. In the exemplary embodiment described here, each drive circuit 122 corresponds to a PWM modulator generating a PWM modulated signal from the received digital signals. Such a PWM modulated signal forms a pulse of maximum amplitude of fixed value and the duration of which is determined by the value to be displayed by the lighting elements 118. Compared to a digital-to-analogue converter, a PWM modulator occupies a much smaller semiconductor surface, and allows to overcome any problems of linearity of the lighting elements 118.

The output of each drive circuit 122 is coupled to the lighting elements 118. The display control signal may be generated by the control circuit 114 or by the video card 108. The frequency of the display control signal is chosen as being high enough to avoid flickering problems, and for example comprised between 100 and 1000 times the image display frequency of the device 100, or even higher still, such as for example equal to a few MHz or a few tens of MHz (the use of a high frequency has the advantage of reducing the need for precision on the frequency of this signal). The control clock signal may be derived from the main clock signal transmitted on the wire 123 or locally created.

Alternatively to the PWM modulator described above, it is possible for each drive circuit 122 to correspond to a BCM modulator. Details of such modulation applied to the display of an array of pixels are given in document EP 3 550 550 A1.

Because the amount of decompressed digital data corresponding to each pixel is chosen to be the same for all pixels to be displayed by the display block 106, shift registers 126 may be used within the display block 106, these registers being inexpensive in semiconductor surface.

Within each display block 106, the shift registers 126 may be connected in series in different ways: row by row, column by column, serpentine, etc. The diagram of connection of the secondary memory circuits 120 to each other within each display block 106 is taken into account when compressing the data so that the lighting elements 118 correctly display the data intended thereto. Thus, the order wherein the digital data is sent in each display block 106 takes into account the connection of the secondary memory circuits 120 within the display block 106.

In the exemplary embodiment described above, all the elements and circuits intended to display each pixel are identical, and all the control circuits 114 are identical, which facilitates their manufacture.

Figure 3:
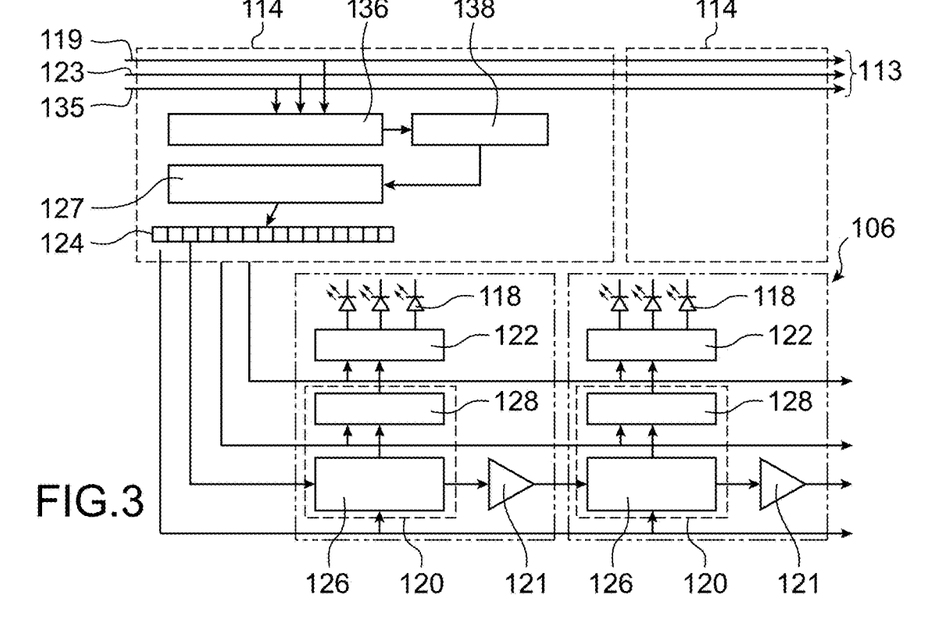
FIG. 3 schematically shows a control circuit of the display device and part of a display block with which the control circuit is associated, according to a second embodiment.

An exemplary embodiment of the display device 100 according to a second embodiment is described below in connection with FIG. 3.

Unlike the first embodiment wherein the digital data is compressed with a compression rate of constant value, the display device 100 according to the second embodiment is configured to use an algorithm compressing the digital data with a variable compression rate. The compression/decompression algorithm used in the compression circuits 115 and the decompression circuits 127 corresponds for example to the RLE ("Run-Length Encoding") algorithm or the Golomb algorithm.

In this second embodiment, the digital data compressed by the compression circuits 115 are sent over a wire 135 forming part of the bus 113 to which the control circuits 114 are coupled. Thus, unlike the first embodiment wherein, in each group 104, the compressed digital data are transmitted in the control circuits 114 which are coupled to each other in series, the compressed digital data are here, in the second embodiment, transmitted in parallel to all the control circuits 114. The identification, by each of the circuits 114, of the encrypted digital data intended for said circuit is carried out by a data reception circuit 136 integrated into each of the control circuits 114 and carrying out for example a decoding of addresses associated with the data.

Each circuit 114 also includes a second main memory circuit 138, for example of the FIFO type, wherein the compressed digital data addressed to the circuit 114 are stored. The use of second main memory circuits 138 of the FIFO type within the circuits 114 allows, in this second embodiment, to absorb, or compensate for, the variations in the compression rate of the compressed digital data received by the circuits 114 and which result in variable amounts of digital data intended for each of the circuits 114. In this second embodiment, since the amount of digital data addressed to each control circuit 114 varies, the digital data corresponding to one or more images to be displayed may be sent and stored in the second main memory circuits 138 while the display device 100 is displaying the data corresponding to another image.

To prevent the second main memory circuits 138 from being saturated and no longer able to memorise images, it is possible for the video card 108 to carry out a calculation allowing to know whether the digital data corresponding to a complete image can be sent to the control 114. A bit memorised in each of the second main memory circuits 138 may also be used to indicate a start of image in order to be able to manage possible overflows of capacities of these second main memory circuits 138.

The compressed digital data memorised in the second main memory circuits 138 are then sent to the decompression circuits 127 which carry out, as in the first embodiment, the decompression of these data. The decompressed digital data are memorised in the main memory circuits 124 then sent to the secondary memory circuits 120 to which the drive circuits 122 are coupled.

Furthermore, in the exemplary embodiment described here, the clock and control signals applied at the input of the secondary memory circuits 120 and of the drive circuits 122 of a display block 106 are emitted from the control circuit 114 associated with this display block 106.

In the exemplary embodiments described above, the compression/decompression algorithm implemented in the display device 100 does not use common data, such as for example correspondence tables used for compression and decompression (by way of illustration, the Huffmann array corresponds to common data used in the case of JPEG). As a variant, it is possible that the compression/decompression algorithm implemented in the display device 100 makes use of such common data which, in this case, is transmitted to each of the control circuits 114. The application of this variant to the first and second embodiments is described below.

Figure 4:
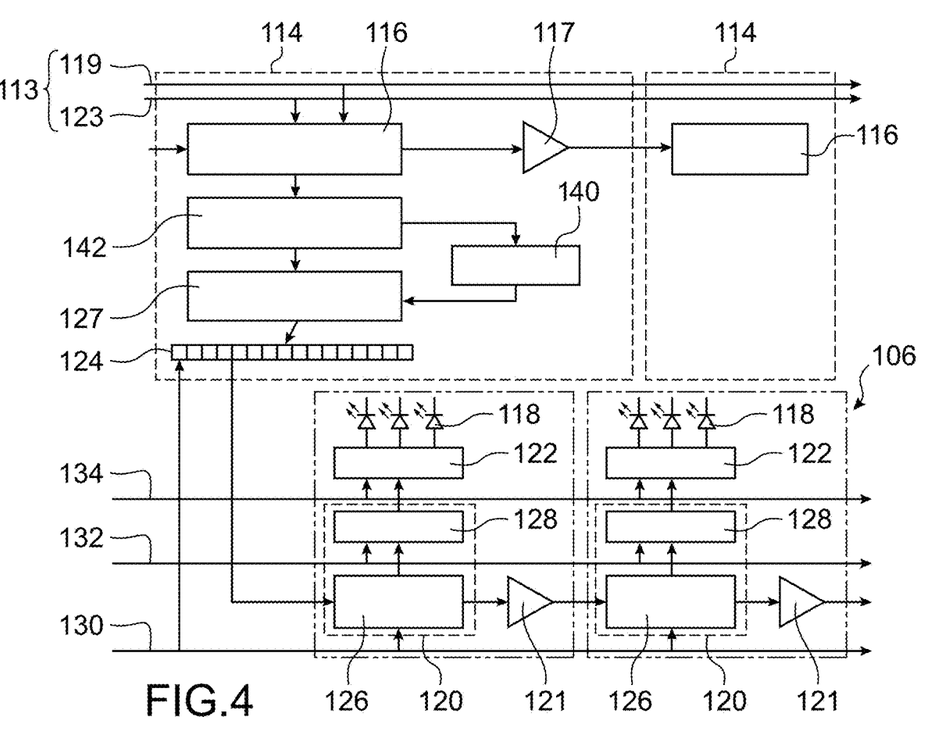
FIG. 4 schematically shows a control circuit of the display device and part of a display block with which the control circuit is associated, according to a variant of the first embodiment.

When this variant (use of common data) is applied to the first embodiment, several solutions are possible:
- using within each control circuit 114 a shift register 116 of greater capacity, transmitting this common data on the same wire as that used for the transmission of the digital data to be displayed (these common data are repeated as many times as the number of control circuits 114 connected in series and interposed between each group of digital data intended for each control circuit 114), or
- using within each control circuit 114 another memory circuit 140 distinct from the shift register 116, and transmit this data common to all the control circuits 114 using a wire separate from that used for the transmission of the digital data to be displayed, or
- using within each control circuit 114 another memory circuit 140 distinct from the shift register 116, and transmitting this common data on the same wire as that used for the transmission of the digital data to be displayed. The common data is in this case transmitted before the digital data and may be distinguished from the digital data to be displayed, for example by agreeing on a header code indicating that it is common data. The header detection performed by a detector 142 may correspond to a comparison between the received header and a header value memorised in the detector 142. Such a solution corresponds to the configuration shown in FIG. 4.

When this variant (use of common data) is applied to the second embodiment, it is possible to send this common data to all the control circuits 114 by using a specific address recognised by all the control circuits 114. The control circuits 114 may in this case include an additional memory circuit wherein these common data are memorised.

Regardless of the compression/decompression algorithm used, it is possible, when the compression rate obtained is not sufficient or even when the amount of data obtained after compression is greater than before compression (which can happen for example with the RLE algorithm), that the data is transmitted without being compressed. A bit of the data transmitted to the control circuits 114 may for example be used to indicate whether the data has been compressed or not.

Furthermore, the display device 100 may use an adaptive compression/decompression algorithm. For example, transmitted images may be compressed and decompressed using different types of algorithm depending on the nature of the image, or else different parts of an image may be compressed using different compression/decompression algorithms. One or more bits of the data transmitted to the control circuits 114 may for example be used to indicate the algorithm used. Each control circuit 114 and each compression circuit is in this case configured to implement these different compression/decompression algorithms.

In all the embodiments and variants described previously, it is possible for the elements intended for the display of each pixel, or at least part of the pixels, to include at least one sensor, or photodetector, thus allowing the display device 100 to perform photodetection from the array 102.

In this case, the photodetectors (which correspond for example to photodiodes) may be coupled to analogue-to-digital converters whose role is to convert the analogue data delivered by the photodetectors into digital data. The choice of the number of bits with which the analogue data is converted depends in particular on the desired resolution and also on the space available in the array 102. By way of example, such an analogue-to-digital converter may be capable of carrying out a conversion on 8 bits or 4 bits, or even 1 bit (in this case the converter forming a comparator).

The data acquired by the photodetectors present in the same display block 106 are sent to the control circuit 114 associated with this display block 106. Advantageously, in order to facilitate the recovery of the photodetection data, the wire serving to the transmission of the digital data signal to be displayed within each display block 106 is looped back from the output of the last register 126 of the display block 106 to an input of the control circuit 114 associated with the display block 106. This configuration, visible in FIG. 5 which schematically shows a display block 106 and on which the loopback wire bears the reference 144, allows to avoid adding an additional wire and another memory circuit in each pixel to transmit the data acquired from the photodetectors to the control circuit 114, which reduces clutter and costs.

Figure 5:
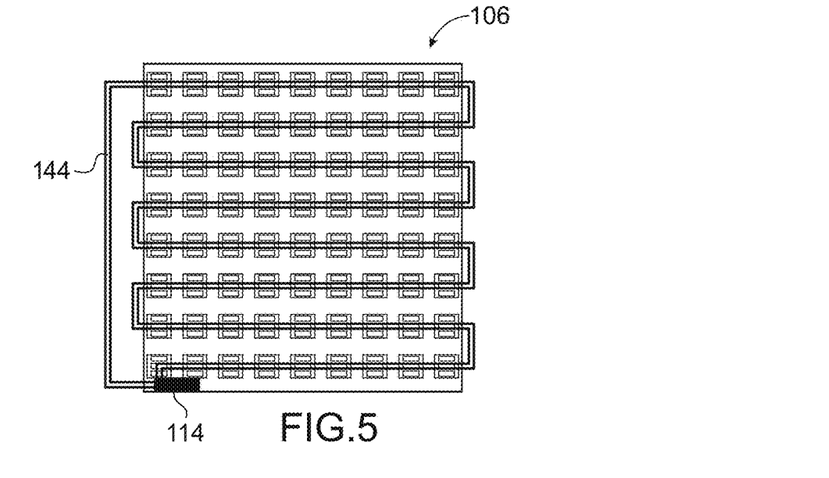
FIG. 5 schematically shows a display block of the display device according to another variant embodiment.

The photodetection data recovered on the control circuits 114 may then be digitally pre-processed in the control circuits 114, for example to perform movement detection by locally storing the data acquired at the previous time, by performing a calculation of the differences with newly acquired data, and transmitting only relevant data, such as changes, which reduces the amount of data to be sent to the outside and then to be processed.

Furthermore, the photodetection data may be compressed before being sent outside the array 102, for example to the video card 108. At least a part of the decompression circuit 127 may be used to carry out this compression within the control circuits 114.

Figure 6:
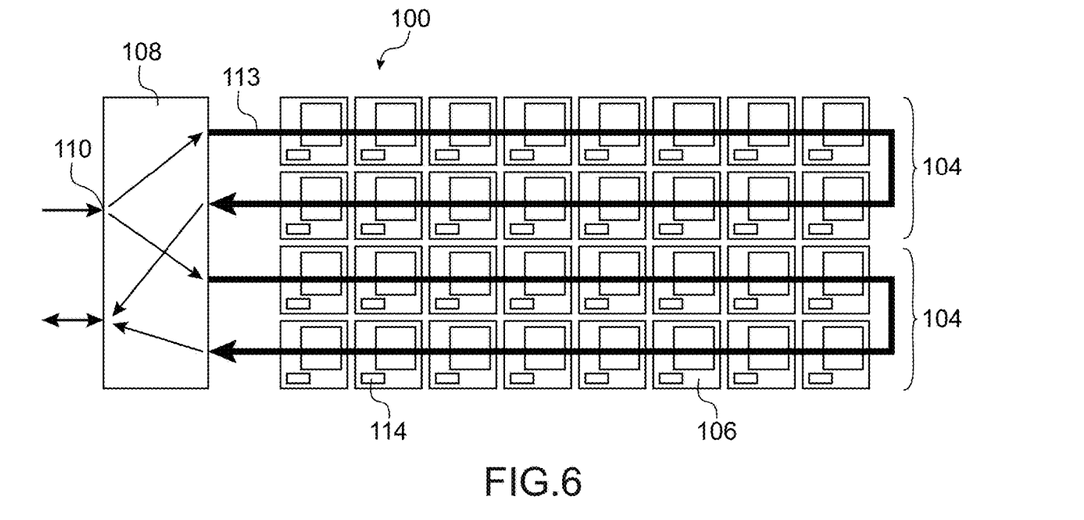
FIG. 6 schematically shows part of a display device according to another variant embodiment.

The sending of data to the video card 108 may be carried out by looping back the buses 113 on inputs of the video card 108, as in the example of FIG. 6. The acquired data may then be transmitted outside the video card 108.

In the exemplary embodiments described above, each secondary memory circuit 120 includes a shift register 126 coupled to a latch 128, and each drive circuit 122 includes a PWM or BCM modulator. As a variant, each control circuit 122 may include, instead of the PWM or BCM modulator, a digital-to-analogue converter outputting an analogue signal driving the light emission of one of the lighting elements 118. Each digital-to-analogue converter converts the digital datum to be displayed memorised in one of the secondary memory circuits 120 into a current sent to the input of one of the lighting elements 118 and whose value is for example determined according to a conversion curve adapted to the features of each lighting element 118.

Compared to digital-to-analogue converters, PWM or BCM modulators have the advantage of being less bulky and of sending analogue signals of the same maximum amplitude to the display elements, which facilitates the control of the lighting elements 118.

Furthermore, in the exemplary embodiments described above, the secondary memory circuit 120 and the drive circuit 122 intended for the display of each pixel receive the data signal as input, a shift clock signal controlling the shift registers 126, a display control signal for the PWM or BCM modulators, and a memorisation trigger signal controlling the latches 128. Alternatively, these elements may only receive a single signal. In this unique signal, the data may be coded using the duration of the pulses such as for example:

a high state of short duration (for example equal to one third of the period) encodes a bit in a first state (for example "0");

a high state of long duration (for example equal to two thirds of the period) encodes a bit in a second state (for example "1");

a low state for a whole period corresponds to a reset, controlling the display of the data found in the registers 142.

In this configuration, upstream of each secondary memory circuit 120, an additional circuit may generate, from the unique signal received, the digital data signal, the shift clock signal controlling the shift registers 126, and the memorisation trigger signal controlling the memorisation, in the latches 128, of the values of the data present in the registers 126.

This configuration has the advantage of limiting the number of wires connected at the input and output of the display blocks 106, thus facilitating the production of the device 100.

In the configurations previously described, the data is transmitted on wires separate from those used for the power supply. Alternatively, it is possible for the digital data to be transmitted by being modulated into the power supply signals. In this case, an additional demodulation step is implemented in the display blocks 106. Details of the embodiment of such a variant are explained in document EP 3 649 672 A1 and can be applied by analogy in the proposed device.

In addition to the elements dedicated to the display of digital data, the display device 100 may include transmission error management circuits (parity code, error correction, signalling bits, etc.) and the control circuits 114 may include the associated digital processing.

In all the embodiments and variants, the control circuits 114 and/or the video card 108 may carry out, in addition to sending the digital data to be displayed and the clock signals to each group 104 and/or display block 106, one or more digital processing operations of the data to be displayed before their compression or after the decompression. This or these digital processing operations of the data may correspond for example to a brightness correction (which will result in an adjustment of the intensity of the analogue signals sent in the lighting elements), a gamma correction (which will result in an application of coefficients of adjustment to the values of the analogue signals sent to the lighting elements according to a colour correction curve for the entire array 102), or a calibration of the lighting elements 118 (which will result in an application of coefficients of adjustment to the values of the analogue signals sent to the lighting elements according to the colours to be corrected). Furthermore, one or more of these digital processing operations may also be carried out directly in each display block 106, in this case by adding one or more digital data processing circuits in the display blocks 106.

Such digital processing may correspond to an operation called "upscaling" operation, allowing to display an image on an array 102 whose resolution is greater than that of the image to be displayed received by the video card 108. The processing carried out on the digital data to perform this upscaling may be implemented within the control circuits 114. Depending on the type of upscaling performed, each control circuit 114 may receive, in addition to the digital data to be displayed by the display block 106 associated therewith, part of the digital data to be displayed by one or more neighbouring display blocks 106, in order to calculate the additional data to be displayed by the display block 106 associated therewith. Alternatively, this upscaling operation may be performed in the video card 108, prior to the compression and the sending of the compressed data to the control circuits 114.

In all the embodiments, it is possible for only part of the digital data to be displayed to be compressed, for example when only the compression of this part of the data allows to reduce the amount of data to be transmitted on the buses 113.

In all the embodiments, the various connections formed by electric wires may be replaced by optical or RF connections.

In the various exemplary embodiments described above, each control circuit 114 is associated with a display block 106. Alternatively, it is possible for each control circuit 114 to be associated with several display blocks 106.

In all the modes and exemplary embodiments previously described, it is possible that the power supply voltages transmitted to the lighting elements 118 have a higher value than that with which the lighting elements 118 are intended to operate. For a power of a given value to be transmitted to the lighting elements 118, this allows to transmit this power with a lower current, which will ultimately allow to reduce the voltage drops, and therefore the losses related to the access resistors. In such a configuration, the device 100 includes voltage reduction circuits interposed between the electrical power source of the device 100 and the lighting elements 118 and which allow to adapt the value of the voltage received to that desired for the operation of the lighting elements 118. Advantageously, the voltage reduction circuits may be integrated into the control circuits 114, which allows not to increase the number of chips to be transferred onto the support.

In the exemplary embodiments described above, the device 100 is configured to display, on the array 102, a single image at a time. In these examples, each display block 106 includes several lighting elements 118, or several sets of lighting elements 118, and several drive circuits 122 allowing the display of several pixels of a single image displayed by the device 100. Each pixel is displayed by a lighting element 118 in the case of a device 100 corresponding to a monochrome screen, or by a set of lighting elements 118 (for example three or four lighting elements 118) emitting lights of different colours in the case of a device 100 corresponding to a colour screen.

According to a variant (which can apply to the various embodiments and configurations described previously), the device 100 may correspond to a multiscopic device intended to simultaneously display an image according to several viewpoints, or angles of view, with the purpose of displaying this image in 3D. In this case, a pixel of the image to be displayed in 3D is formed of as many sub-pixels as there are viewpoints of the image to be displayed by the device 100. The sub-pixels which form a pixel of the 3D image correspond to pixels with the same spatial coordinates within the images forming the different viewpoints to be displayed simultaneously by the device 100. The images forming the different viewpoints of a 3D image all include the same number of pixels.

In the case of such a multiscopic device 100, it is advantageous to carry out the compression/decompression of the digital data by using the very strong correlations existing between the images forming the different viewpoints of the same 3D image.

Figure 8:
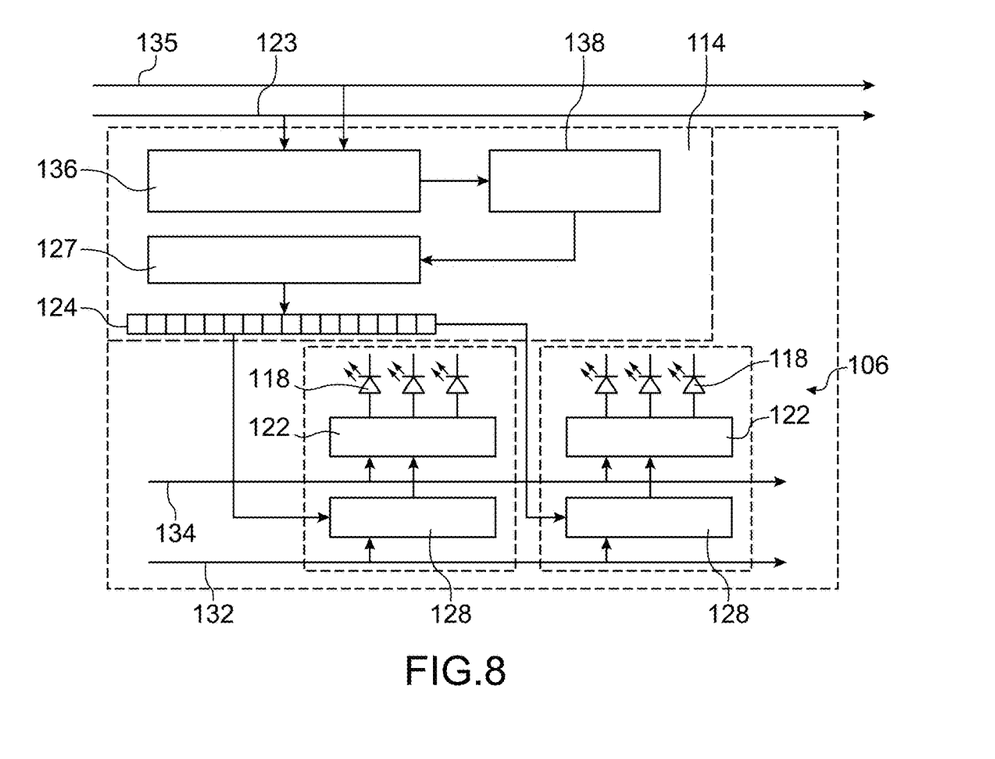
FIG. 8 schematically shows a control circuit of the display device and part of a display block with which the control circuit is associated, according to a first variant embodiment of a multiscopic display device.

In the case of such a multiscopic device 100, it is possible for each display block 106 to be configured to display a single pixel of the 3D image, that is to say to display the various sub-pixels forming this pixel. Each sub-pixel is displayed by a lighting element 118 in the case of a device 100 corresponding to a monochrome screen, or by a set of lighting elements 118 emitting lights of different colours in the case of a device 100 corresponding to a colour screen. In this configuration, all the lighting elements 118 of the same display block 106 as well as the control circuit 114 associated with this display block 106 may be made on the same electronic chip. FIG. 8 schematically shows a control circuit 114 and part of the elements of the display block 106 associated with this circuit, in such a configuration, produced on the same electronic chip. In this figure, the secondary memory circuits 120 include only the latches 128 (and not the shift registers 126) because given that the control circuit 114 and the associated display block 106 are made on the same electronic chip, the distribution data between the control circuit 114 and each secondary memory circuit 120 may be carried out directly by a dedicated connection.

By way of example, the device 100 may be configured to display a 3D image with a resolution equal to 1920×1080 pixels, that is to say a simultaneous display of N images each with a resolution equal to 1920×1080 sub-pixels and corresponding to a different viewpoint of the same scene, N being an integer for example equal to 49 or any other number greater than 1 allowing to produce a multiscopic display of an image.

Figure 9:
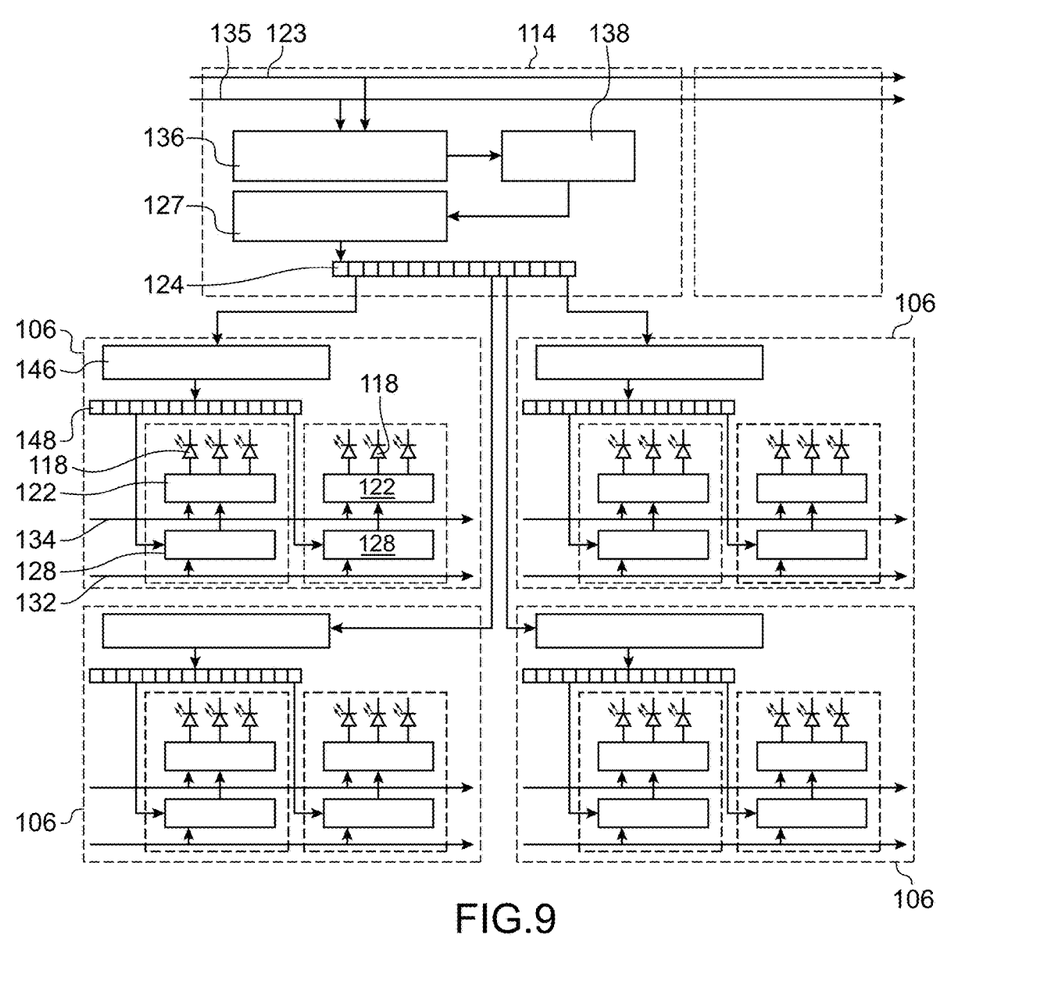
FIG. 9 schematically shows a control circuit of the display device and part of display blocks with which the control circuit is associated, according to a second variant embodiment of a multiscopic display device.

In the case of a multiscopic device 100, it is also possible for each display block 106 to include the lighting elements 118, the drive circuits 122 and the secondary memory circuits 120 intended to display several pixels, that is to say multiple sets of sub-pixels. In this case, it may be advantageous for the compression circuit(s) 115 to carry out a first compression of the data within each of the images corresponding to the different viewpoints to be displayed, taking advantage of the redundancy within each pixel of the 3D image, then a second compression of the data by considering the data of several adjacent pixels forming part of the same display block 106, taking advantage of the redundancy between the neighbouring pixels of the 3D image. Upon receiving the data thus compressed, each control circuit 114 performs, via the decompression circuit 127, a first decompression of the data intended for all the display blocks 106 associated with this control circuit. The data obtained after this first decompression is memorised in the main memory circuit 124 of the control circuit 114, then allocated and sent to the appropriate display block 106. Each display block 106 further includes a secondary decompression circuit 146 receiving the data sent from the main memory circuit 124 and carrying out a second decompression of the data corresponding to a single pixel of the 3D image to be displayed. Each display block 106 may further include a memory circuit 148 wherein the decompressed data is memorised before being sent to the secondary memory circuits 120 of the block 106.

FIG. 9 schematically shows such a configuration, wherein each control circuit 114 is associated with a group of 2×2 display blocks 106. Alternatively, each control circuit 114 may be associated with a number of display blocks different from 4, for example 16 display blocks 106 arranged in a group of 4×4 blocks. Furthermore, in the example of FIG. 9, the secondary memory circuits are formed only by the latches 128.

Alternatively, secondary decompression circuits 146 may be formed within the control circuits 114.

Figure 10:
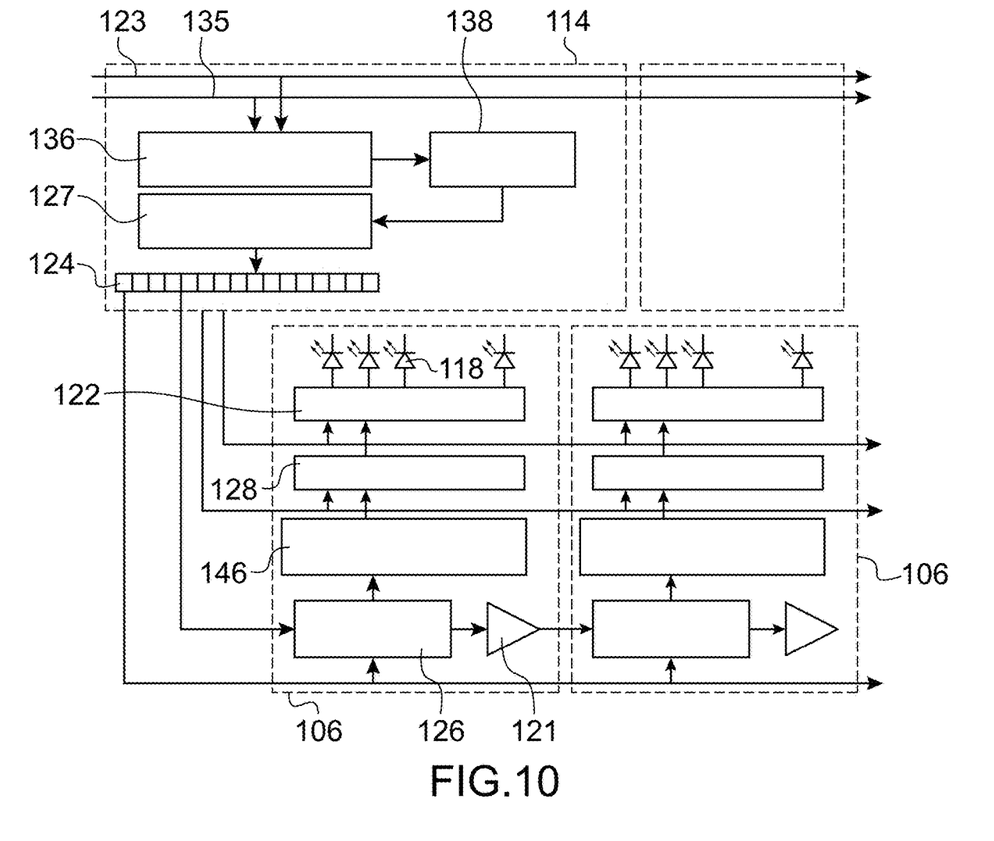
FIG. 10 schematically shows a control circuit of the display device and part of a display block with which the control circuit is associated, according to a third variant embodiment of a multiscopic display device.

When each control circuit 114 is associated with a large number of display blocks 106, for example with a group of 8×8 blocks 106, it is possible to use, within each display block 106, the shift registers 126 and to have the secondary decompression circuits 146 interposed between the shift registers 126 and the latches 128. This configuration has the advantage of reducing the number of wires between the control circuits 114 and the display blocks 106. FIG. 10 schematically shows such a configuration. In the example of FIG. 10, each display block 106 includes a single register 126 and a latch 128 whose memory capacities allow the memorisation of all the data intended to be displayed by the display block 106.

Figure 11:
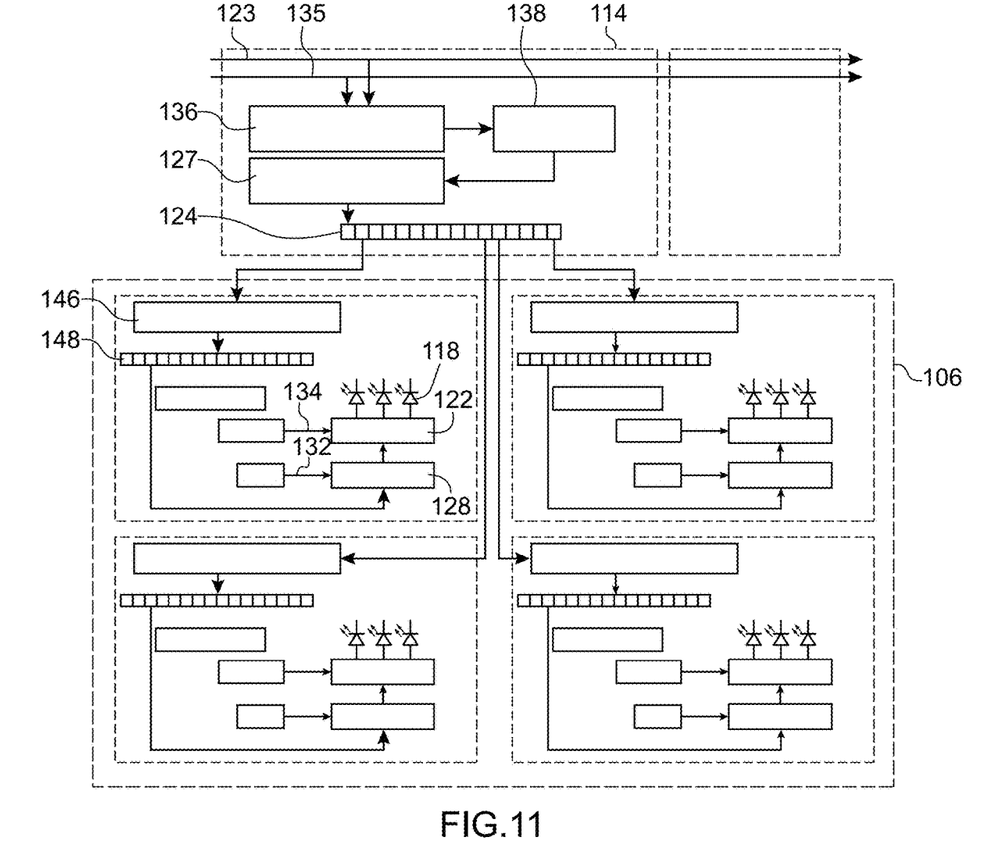
FIG. 11 schematically shows a control circuit of the display device and part of a display block with which the control circuit is associated, according to a fourth variant embodiment of a multiscopic display device.

The various configurations described above relating to the production of a multiscopic device 100 may also be applied, similarly, to the production of a display device 100 which is not multiscopic but wherein the data are compressed temporally, that is to say that the various compressed images do not correspond to images according to different viewpoints to be displayed simultaneously, but to images intended to be displayed sequentially, one after the other, by the device 100. FIG. 11 shows such an exemplary embodiment, wherein each display block 106 is configured to display several pixels, here a block of 2×2 pixels. In this exemplary embodiment, the compression circuit(s) 115 carry out a first compression of the data within each of the images to be displayed, taking advantage of the temporal redundancy in pixels of the same spatial coordinates, then a second compression of the data by considering the data of several adjacent pixels, taking advantage of the redundancy between the neighbouring pixels of the same image. Upon receiving the data thus compressed, each control circuit 114 carries out, via the decompression circuit 127, a first decompression of the data intended for all the lighting elements 118 of the display block 106 associated with this control circuit 114. The data obtained after this first decompression are memorised in the main memory circuit 124 of the control circuit 114, then allocated and sent to the various secondary decompression circuits 146 of the display block 106 which receive the data sent from the main memory circuit 124 and which carry out a second decompression of the data corresponding to a single pixel of the images to be displayed successively. The decompressed data are stored in memory circuits 148 before being successively sent to the latches 118.

In all the embodiments and variant embodiments previously described, the electrical connections between the control circuits 114 and the display blocks 106 are represented by one or more wires connecting these elements, for example one or more wires connecting one of the main memory circuits 124 to one or more secondary memory circuits 120 or to one or more secondary decompression circuits 146. In practice, these connections generally include one or more intermediate electronic circuits controlling the transfer of data from the main memory circuits 124 to the display blocks 106.

Furthermore, in all the embodiments and variant embodiments previously described, it is possible that the data received on the input 110 of the video card 108 is compressed in a format different from that adapted to the array of pixels 102, that is to say having undergone compression by an algorithm different from that applied by the compression circuit(s) 115 to compress the data before sending them to the output(s) 112. In this case, each control circuit 114 includes an additional decompression allowing to decompress the data by applying the reverse operation to that used for the compression carried out upstream of the sending of the data to the video card 108.

The invention claimed is:

1. A display device including at least:
   an array of display blocks, each display block being configured to display at least one pixel of an image and comprising several lighting elements and at least one drive circuit configured to generate control signals for the lighting elements of the display block from digital data intended to be displayed by the lighting elements of the display block;
   an array of control circuits, each coupled with a respective different display block among the array of display blocks and including a first main memory circuit configured to store the digital data intended to be displayed by the lighting elements of the associated display block;
   a video card comprising at least one input configured to receive a digital signal to be displayed by the array of display blocks, and at least one output of digital data coupled to the array of control circuits by a data distribution circuit, the video card being configured to decode the digital signal and send to the control circuits the digital data intended to be displayed by the lighting elements which are derived from the digital signal received by the video card and encoded in a format adapted to the array of display blocks;
   and wherein:
   the video card includes at least one compression circuit configured to compress, before sending them to the output, the digital data intended to be displayed by the lighting elements;
   each control circuit includes a decompression circuit configured to decompress the digital data intended to be displayed by the lighting elements of the display block associated with the control circuit before storing them in the first main memory circuit of the control circuit.

2. The display device according to claim 1, wherein each display block corresponds to a module distinct from the other display blocks transferred onto a support on which the array of control circuits is located.

3. The display device according to claim 1, wherein each control circuit further includes a second main memory circuit configured to memorize the compressed digital data received by the control circuit and intended to be displayed by the lighting elements of the display block associated with the control circuit.

4. The display device according to claim 3, wherein the second main memory circuit of each control circuit is of the FIFO type.

5. The display device according to claim 1, wherein the compression circuit of the video card and the decompression circuit of each control circuit are configured to implement at least one JPEG, RLE or Golomb type compression/decompression algorithm.

6. The display device according to claim 1, wherein each display block is configured to display a block of 8×8 pixels of the image, or a block of 16×16 pixels of the image, or a block of 32×32 pixels of the image.

7. The display device according to claim 1, wherein the compression circuit of the video card and the decompression circuit of each control circuit are configured to implement several different compression/decompression algorithms to compress and decompress the digital data corresponding to one or more images intended to be displayed by the array of display blocks.

8. The display device according to claim 1, wherein the display device is a multiscopic device wherein:
   each display block is configured to display at least one pixel of a 3D image formed by N images of the same dimensions intended to be displayed simultaneously by the display device, each pixel of the 3D image comprising N sub-pixels of the same spatial coordinates and each belonging to one of the N images,
   the compression circuit is configured to compress the digital data intended to be displayed by the lighting elements of each display block by using a redundancy of information between the N sub-pixels of the same pixel.

9. The display device according to claim 8, wherein:
   the compression circuit is configured to carry out a first compression using a redundancy of information between the N sub-pixels of the same pixel, and to carry out a second compression of the data resulting from the first compression by using a redundancy information between neighboring pixels intended to be displayed by the same display block;
   the decompression circuit of each control circuit is configured to carry out a decompression corresponding to the reverse operation of the second compression;
   each display block includes a secondary decompression circuit configured to carry out a decompression corresponding to the inverse operation of the first compression.

10. The display device according to claim 1, wherein:
    the compression circuit is configured to carry out a first compression using a redundancy of information between the digital data corresponding to several pixels of the same spatial coordinates and belonging to several images of the same dimensions intended to be displayed successively by the display device, and to carry out a second compression of the data resulting from the first compression by using a redundancy of information between neighboring pixels intended to be displayed simultaneously by the same display block;
    the decompression circuit of each control circuit is configured to carry out a decompression corresponding to the reverse operation of the second compression;
    each display block includes a secondary decompression circuit configured to carry out a decompression corresponding to the inverse operation of the first compression.

11. The display device according to claim 1, wherein each control circuit includes at least one data reception circuit configured to identify the digital data intended to be displayed by the lighting elements of the display block associated with the control circuit.

12. The display device according to claim 1, wherein the control circuits include shift registers separate from the main memory circuits and coupled in series from one control circuit to another.

13. The display device according to claim 1, wherein the video card further includes at least one FIFO type memory configured to store the digital data intended to be displayed by the lighting elements before sending them to the control circuits.

14. The display device according to claim 1, wherein each control circuit is formed by a chip separate from the associated display block, or wherein each control circuit is integrated into the associated display block.

* * * * *